(12) United States Patent
Kim (10) Patent No.: US 9,137,586 B2
(45) Date of Patent: Sep. 15, 2015

(54) CONTENT CREATION METHOD AND MEDIA CLOUD SERVER

(71) Applicant: Alticast Corporation, Seoul (KR)

(72) Inventor: Soo Woong Kim, Seoul (KR)

(73) Assignee: Alticast Corporation, Seoul (KR)

( * ) Notice: Subject to any disclaimer, the term of this patent is extended or adjusted under 35 U.S.C. 154(b) by 0 days.

(21) Appl. No.: 13/893,875

(22) Filed: May 14, 2013

(65) Prior Publication Data

US 2014/0189768 A1 Jul. 3, 2014

(30) Foreign Application Priority Data

Dec. 28, 2012 (KR) .......................... 10-2012-0155889
May 13, 2013 (KR) .......................... 10-2013-0053884

(51) Int. Cl.
| | |
|---|---|
| H04N 7/16 | (2011.01) |
| H04N 21/845 | (2011.01) |
| H04N 21/218 | (2011.01) |
| H04N 21/231 | (2011.01) |
| H04N 21/232 | (2011.01) |
| H04N 21/234 | (2011.01) |
| H04N 21/274 | (2011.01) |
| H04N 21/482 | (2011.01) |
| H04N 21/81 | (2011.01) |
| H04N 21/8549 | (2011.01) |

(52) U.S. Cl.
CPC ......... *H04N 21/8456* (2013.01); *H04N 21/218* (2013.01); *H04N 21/231* (2013.01); *H04N 21/232* (2013.01); *H04N 21/234* (2013.01); *H04N 21/274* (2013.01); *H04N 21/4828* (2013.01); *H04N 21/8133* (2013.01); *H04N 21/845* (2013.01); *H04N 21/8455* (2013.01); *H04N 21/8549* (2013.01)

(58) Field of Classification Search
CPC ..... H04N 21/20; H04N 21/21; H04N 21/218; H04N 21/231; H04N 21/232; H04N 21/234; H04N 21/274; H04N 21/2743; H04N 21/2747; H04N 21/278; H04N 21/845; H04N 21/8455; H04N 21/8456
USPC ............................ 725/86–104, 105, 114, 115
See application file for complete search history.

(56) References Cited

U.S. PATENT DOCUMENTS

| | | | |
|---|---|---|---|
| 2003/0009371 A1* | 1/2003 | Gauba et al. ..................... | 705/10 |
| 2005/0120126 A1* | 6/2005 | Gupta et al. .................. | 709/231 |
| 2007/0199037 A1* | 8/2007 | Matsuzaki et al. ............. | 725/115 |
| 2010/0125882 A1* | 5/2010 | Athias .............................. | 725/88 |
| 2010/0242079 A1* | 9/2010 | Riedl et al. .................... | 725/115 |
| 2010/0269145 A1* | 10/2010 | Ingrassia et al. .............. | 725/110 |
| 2011/0208722 A1* | 8/2011 | Hannuksela .................. | 707/723 |

FOREIGN PATENT DOCUMENTS

| | | | |
|---|---|---|---|
| JP | 2005-284392 A | 10/2005 | |
| JP | 2011-142468 A | 7/2011 | |
| JP | 2011-530137 A | 12/2011 | |
| JP | 2012-142969 A | 7/2012 | |

* cited by examiner

*Primary Examiner* — Jeremy Duffield
(74) *Attorney, Agent, or Firm* — Mintz Levin Cohn Ferris Glovsky and Popeo, P.C.; Kongsik Kim (57) ABSTRACT

A method and a media cloud server for creating content are disclosed. The method includes: recording and storing a real-time broadcast content transmitted through a broadcaster system; dividing the stored broadcast content according to a predetermined method and storing the segments; storing metadata including descriptions of the segments; and creating a user content by extracting at least one segments using the metadata and synthesizing the extracted segments in response to a request from a client device.

14 Claims, 5 Drawing Sheets

| image ID | channel | program name | broadcast time | cast | synopsis | keyword |
|---|---|---|---|---|---|---|
| 10023 | EPG | Romeo & Juliet | ... | | | |
| 10024 | | | January 23, 2012, 01 hr 05 min ~ January 23, 2012, 01 hr 07 min | Romeo, Juliet | Romeo and Juliet share a goodbye kiss | goodbye, kiss |
| 10025 | | | January 23, 2012, 01 hr 05 min ~ January 23, 2012, 01 hr 08 min | Juliet, priest | Juliet receives a drug from the priest | Juliet, priest, drug |
| | | ... | | | | |
| 10026 | | Sleeping Beauty | ... | | | |

| image ID | channel | program name | broadcast time | cast | synopsis | keyword |
|---|---|---|---|---|---|---|
| 10023 | EPG | Romeo & Juliet | · · · | | | |
| 10024 | | | January 23, 2012, 01 hr 05 min ~ January 23, 2012, 01 hr 07 min | Romeo, Juliet | Romeo and Juliet share a goodbye kiss | goodbye, kiss |
| 10025 | | | January 23, 2012, 01 hr 05 min ~ January 23, 2012, 01 hr 08 min | Juliet, priest | Juliet receives a drug from the priest | Juliet, priest, drug |
| | | | · · · | | | |
| 10026 | | Sleeping Beauty | · · · | | | |

CONTENT CREATION METHOD AND MEDIA CLOUD SERVER

CROSS-REFERENCE TO RELATED APPLICATIONS

This application claims the benefit of Korean Patent Application Nos. 10-2012-0155889 (filed on Dec. 28, 2012) and 10-2013-0053884 (filed on May 13, 2013), filed with the Korean Intellectual Property Office. The disclosures of the above applications are incorporated herein by reference in their entirety.

BACKGROUND

1. Technical Field

The present invention relates to a method and a media cloud server for creating content according to a user scenario by using broadcast contents.

2. Description of the Related Art

With developments in information communication technology, there is a growing trend of users going beyond merely consuming the various contents provided online to the level of creating desired contents and sharing them with other people.

In order to create a desired video content, a user may have to shoot a desired image using equipment that includes a camera function and then edit the image. However, it can be very difficult or at least inconvenient to find a location or a cast suitable for the shooting of the desired image. Moreover, a high level of skill would be required for an individual to personally edit an image shot using camera equipment.

In another example, a video content can also be made by synthesizing various types of images using chroma keying, but synthesis equipment using chroma keying are highly expensive and as such may not be available to general users.

SUMMARY

An aspect of the invention is to provide a content creation method and a media cloud server that enable a user to easily create a desired content by using actual broadcast contents.

An embodiment of the invention can provide a media cloud server that includes: a segmenting unit, which records and stores a real-time broadcast content transmitted through a broadcaster system, divides the stored broadcast content according to a predetermined method, and stores the content as segments; a metadata managing unit, which stores metadata including descriptions of the segments; and a synthesizing unit, which extracts at least one segments using the metadata and synthesizes the extracted segments to create a user content, in response to a request from a client device.

The request can include a user scenario, and the synthesizing unit can analyze the user scenario to extract at least one keyword, perform a match search for the extracted keyword and the metadata, and extract and synthesize the segments having high match rates.

The metadata can include at least one of the identification information for the segment, the cast in each scene, the synopsis of each scene, the channel information, the broadcast time, and the broadcast content name, while the user scenario can include at least one of a cast, a synopsis, a time, and a location.

The segmenting unit can further acquire metadata including a description of the broadcast content via the broadcaster system, and the segmenting unit can generate a storage path for storing the segment by using the metadata of the broadcast content and store the segment at the storage path.

The media cloud server can further include a content provider unit configured to provide the user content by a download or a streaming method according to a content provision request from the client device.

The content provider unit can store a play history according to the provision of the user content, and if a user requests a continued play of the user content through a different client device carried by the user, the content provider unit can provide a stream of the user content without interruption by using the play history.

The user content can be set to be shared with another user or user group, and the content provider unit can provide the user content to the another user or user group according to a request from the another user or user group.

The segmenting unit can divide the broadcast content into at least one of predetermined periods, frame units, particular durations, sub-program units, and scene units.

Another aspect of the invention provides a method of creating a content according to a user scenario by using broadcast contents.

An embodiment of the invention can provide a method of creating a content that includes: recording and storing a real-time broadcast content transmitted through a broadcaster system; dividing the stored broadcast content according to a predetermined method and storing the segments; storing metadata including descriptions of the segments; and creating a user content by extracting at least one segments using the metadata and synthesizing the extracted segments in response to a request from a client device.

The request can further include a user scenario, and the creating of the user content can include analyzing the user scenario to extract at least one keyword, performing a match search for the extracted keyword and the metadata, and extracting and synthesizing the segments corresponding to metadata having high match rates.

A content creation method and a media cloud server according to an embodiment of the invention enable a user to easily create a desired content using actual broadcast contents.

Additional aspects and advantages of the present invention will be set forth in part in the description which follows, and in part will be obvious from the description, or may be learned by practice of the invention.

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Certain embodiments of the invention will be described below in more detail with reference to the accompanying drawings.

Figure 1:
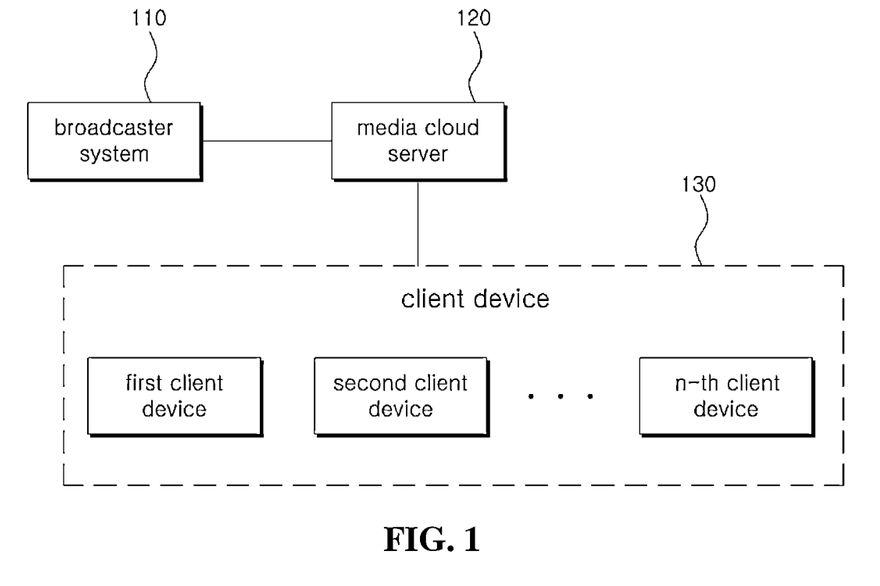
FIG. 1 illustrates a media cloud system capable of recording and reprocessing broadcast contents to create a user content according to an embodiment of the invention.

FIG. 1 illustrates a media cloud system capable of recording and reprocessing broadcast contents to create a user content according to an embodiment of the invention.

Referring to FIG. 1, a media cloud system may be composed of a broadcaster system 110, a media cloud server 120, and at least one client device 130.

The broadcaster system 110 may convert real-time broadcast contents into a predetermined codec format and transmit the converted broadcast contents. The method for transmitting broadcast contents at the broadcaster system 110 is obvious to the skilled person and as such will not be elaborated here in further detail.

The media cloud server 120 may access the broadcaster system 110 to acquire the broadcast contents, divide the broadcast contents according to a predetermined method, and store the contents as segments. In order to thus access the broadcaster system 110 and acquire and store the broadcast contents, the media cloud server 120 may independently store and manage broadcast schedule information.

For example, the media cloud server 120 can receive a request to record a particular broadcast content from a client device 130. In response, the media cloud server 120 can, by using the broadcast schedule information stored in the media cloud server 120, access the broadcaster system 110 that transmits the broadcast contents for which recording is requested, and can then acquire and store the broadcast contents. Here, the media cloud server 120 can divide a broadcast content according to a predetermined method to create segments and can store these in storage paths according to a predetermined method.

According to a preferred embodiment of the invention, the media cloud server 120 can segment a broadcast program received from a broadcaster system 110 into preset time intervals to generate and store the plurality of segments.

Here, a segment is defined as a portion of a broadcast program divided in units of seconds or minutes. Preferably, a segment can include an I-frame and can be played or displayed on its own at a client device 130.

Generally, a broadcast program can be encoded according to the MPEG2 specification, whereby the image of a broadcast program can include the I-frame (intra-coded frame), P-frame (predictive-coded frame), and B-frame (bidirectionally interpolated frame).

Here, the I-frame is an encoded frame, the P-frame is a frame that is generated by prediction from a previous frame, and the B-frame is a frame that is predicted using a previous and a subsequent frame.

According to an embodiment of the invention, a segment may be a unit that can be played independently, and as such, each segment may include an I-frame.

A process for creating a segment is described below in further detail.

Initial Frames: I1-B1-B2-B3-P1-I2-B4-B5-B6-P2-P3-I3-I4-B7-P4- . . .

For the initial frames given as above, if it is assumed that the unit of each segment is 1 second and that each second contains three frames, the frames can be modified as follows.

Modified frames: I1-B1-B2-I101-B3-P1-I102-I2-B4-I103-B5-B6-I104-P2-P3-I3-I4-B7-P4- . . .

That is, an I-frame may be generated for each second, and the segments can be created based thereon. The segments obtained may be as shown below.

first segment=I1-B1-B2
second segment=I101-B3-P1
third segment=I102-I2-B4
fourth segment=I103-B5-B6
fifth segment=I104-P2-P3
sixth segment=I3
seventh segment=I4-B7-P4

Here, I101, I102, I103, and I104 are I-frames newly created to enable playing for the respective segments, and each form a first I-frame in each segment based on the last frame (B2, P1, B4, B6) of the previous segment.

The data for creating the I-frames may be stored beforehand in the memory, making it possible to create each I-frame as above using the last frame of the previous segment.

In the above, I3 and I4, which are I-frames that appear consecutively, can be for a part where there is a change of scene. As such, a segment at a part in which there is a scene change can include just one I-frame.

The media cloud server 120 can also create a user content by using the broadcast contents recorded and stored according to a request from a client device 130 and send the user content to the client device 130.

For example, the media cloud server 120 can search metadata associated with the segments according to a request from a client device 130, extract at least one segment that is suited to the request, synthesize these to process them into a user content, and send it to the client device 130. Here, the media cloud server 120 can send the user content to the client device 130 by a download or a streaming method.

Also, the media cloud server 120 may store at least one of the broadcast content, segments, and user content in a cloud storage space, and can provide a content without interruption to allow an N screen service between multiple client devices carried by the user. To this end, the media cloud server 120 can independently store and manage content play history for each client device 130.

The client device 130 may request the media cloud server 120 to record a broadcast content and then receive and play the recorded broadcast content, or may receive via the media cloud server 120 and play a user content that is reprocessed using the recorded broadcast content according to a user request.

For example, the client device 130 can be an electronic device equipped with a wired or a wireless communication module, such as a TV, a set-top box, a mobile communication terminal, a note pad, a PDA, a tablet PC, a computer, etc.

Figure 2:
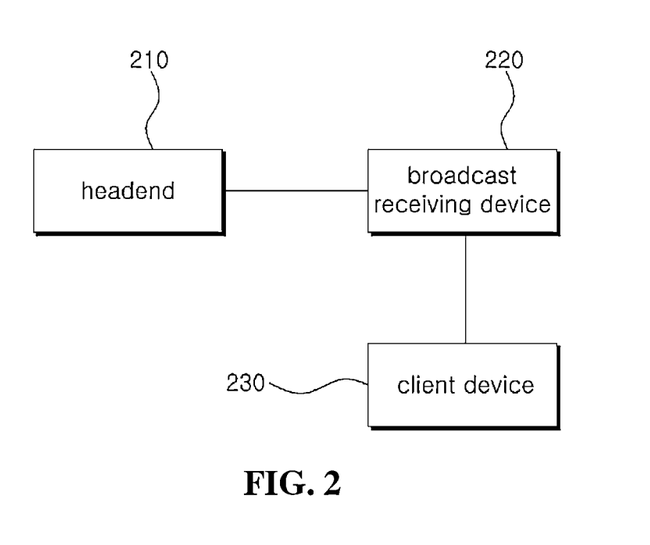
FIG. 2 schematically illustrates a typical system for recording broadcast contents.

FIG. 2 schematically illustrates a typical system for recording broadcast contents.

As illustrated in FIG. 2, a typical system for recording broadcast contents may be composed of a headend 210, a broadcast receiving device 220, and a client device 230.

The headend 210 may provide real-time or on-demand broadcast contents according to broadcast schedule information.

The broadcast receiving device 220 may access the headend 210 to be provided with the real-time or on-demand broadcast contents.

Accordingly, in order for the client device 230 to record a particular broadcast content, it may be necessary to register information on the recording time and the broadcast content to be recorded, through the broadcast receiving device 220 connected to the client device 230, or input the recording information into the broadcast receiving device 220 by manipulating a remote controller.

Thus, the broadcast receiving device 220 may access the headend 210 to record the broadcast content according to the recording information and store it in a storage space within the broadcast receiving device 220. As such, the client device 230 can play the recorded broadcast content only after connecting to the broadcast receiving device 220.

This recording method based on the related art involves storing the recorded content in a storage space within the broadcast receiving device 220, and therefore, a user is essentially unable to access a recorded broadcast content from locations other than where the broadcast receiving device 220 is located.

However, by recording broadcast contents using broadcast schedule information and then storing the broadcast contents in the media cloud server 120, i.e. a cloud storage space, as in FIG. 1, a broadcast content for which a user requested a recording can be played by the user from any place at any time.

Also, by storing the recorded broadcast contents in the media cloud server 120, i.e. a cloud storage space, the user can play a recorded broadcast content without interruption through a connection of multiple client devices carried by the user.

The method of recording and playing broadcast contents by way of a media cloud server 120 according to an embodiment of the invention thus differs from prior art, as exemplified in the descriptions of FIG. 1 and FIG. 2. The following descriptions will focus on a method of creating a user content by reprocessing recorded broadcast contents.

Figure 3:
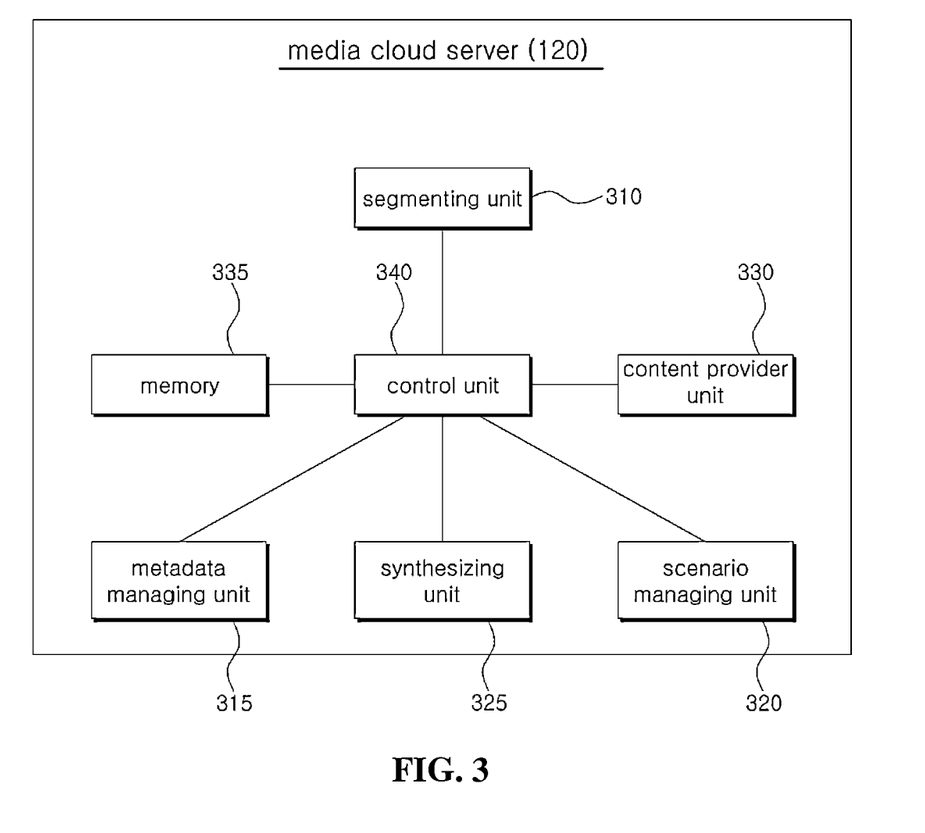
FIG. 3 schematically illustrates the internal composition of a media cloud server according to an embodiment of the invention.
Figure 4:
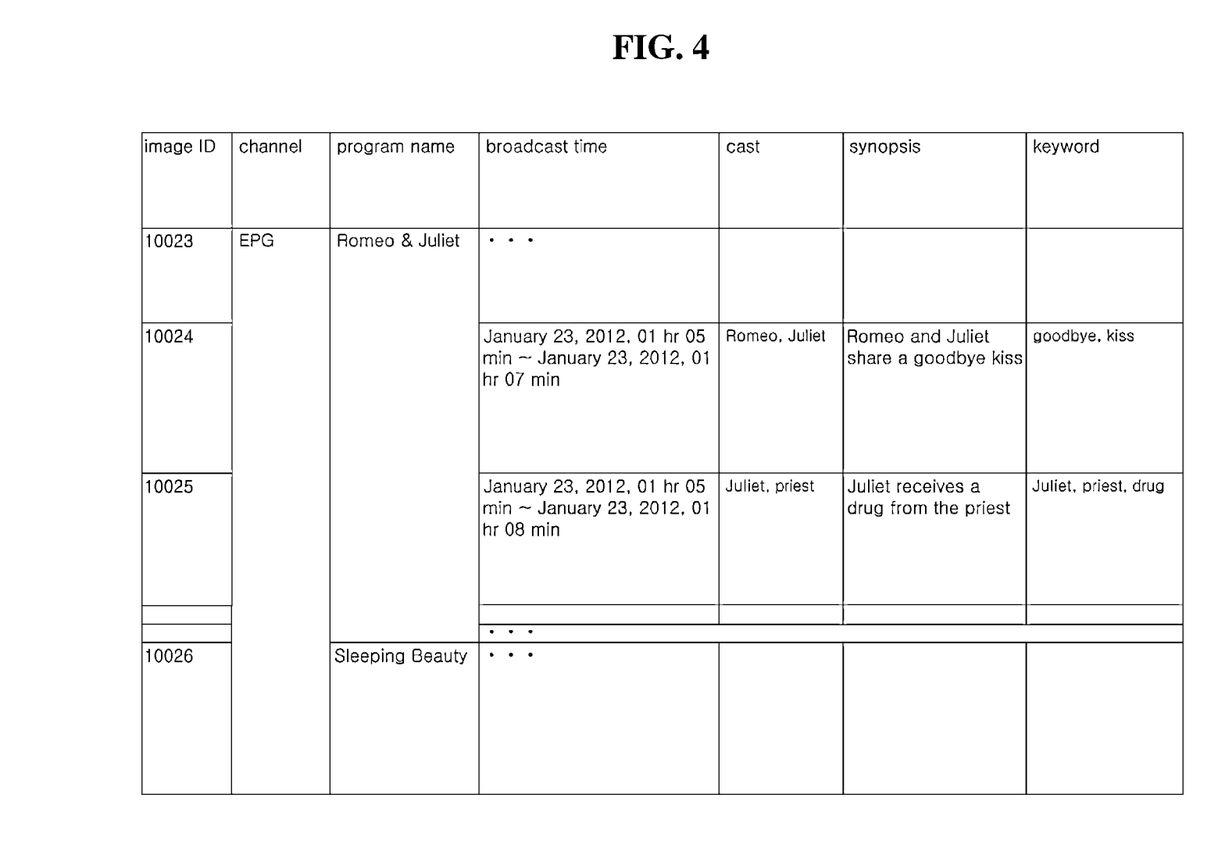
FIG. 4 illustrates an example of metadata for segments according to an embodiment of the invention.

FIG. 3 schematically illustrates the internal composition of a media cloud server according to an embodiment of the invention, and FIG. 4 illustrates an example of metadata for segments according to an embodiment of the invention.

Referring to FIG. 3, a media cloud server 120 according to an embodiment of the invention may be composed of a segmenting unit 310, a metadata managing unit 315, a scenario managing unit 320, a synthesizing unit 325, a content provider unit 330, a memory 335, and a control unit 340.

The segmenting unit 310 may receive and store broadcast contents by using broadcast schedule information stored in the memory 335, storing the broadcast contents such that the stored broadcast contents are divided according to a predetermined method.

In one example, the segmenting unit 310 can receive the broadcast contents transmitted from each broadcaster system 110 by using the broadcast schedule information, and store each of the broadcast contents. In another example, the segmenting unit 310 can receive, record, and store only the broadcast contents that correspond to the recording requests received via the client device 130.

Thus, the segmenting unit 310 can store the broadcast contents transmitted by the broadcaster system 110, and store the contents by dividing each broadcast content by a predetermined method. Here, various methods can be used for dividing the broadcast contents. In one example, the segmenting unit 310 can divide the broadcast contents into predetermined periods (e.g. hours, minutes, seconds, etc.). In another example, if the broadcast contents are video contents, the segmenting unit 310 can also divide the contents into frame units when storing. This is substantially the same as in the description of the media cloud server 120, and as such, redundant descriptions are omitted.

In another example, the segmenting unit 310 can divide the broadcast contents into certain durations, sub-program units, or certain scene units. A sub-program can be a program or an episode included in the broadcast content (e.g. each episode unit of a broadcast content having an omnibus format). For example, a program unit such as a monologue portion or a guest interview portion of a talk show can be a sub-program. Of course, the segmenting unit 310 can divide the broadcast contents according to various other methods.

Also, the segmenting unit 310 can store segments after generating a storage path according to a predetermined method.

For example, the segmenting unit 310 can generate storage paths using at least one of the broadcast channel information, broadcast date information, and division method, and store the segments in the respective storage paths.

For example, the segmenting unit 310 can generate the storage paths as follows.

/[raw_data]/[broadcast_channel_ID]/[broadcast_date]/[hour_minute_second]

For instance, suppose a particular broadcast content broadcasted on channel EPG on Jan. 23, 2012, is recorded. The segmenting unit 310 can generate the following storage paths for the segments.

/RAW/EPG/20120123/000000/* image from 00 hr 00 min 00 sec~00 hr 00 min 01 sec */

/RAW/EPG/20120123/000001/* image from 00 hr 00 min 01 sec~00 hr 00 min 02 sec */

/RAW/EPG/20120123/000002/* image from 00 hr 00 min 02 sec~00 hr 00 min 03 sec */

Also, when acquiring the broadcast contents, the segmenting unit 310 can also acquire and store metadata that includes descriptions of the broadcast contents from the broadcaster systems.

The metadata managing unit 315 may maintain and manage the metadata for the broadcast contents and the segments for the broadcast contents.

Here, the metadata for a segment can include a description for the corresponding segment. For example, the metadata for the segment can include at least one of channel information regarding the channel on which the broadcast content was shown, program name, broadcast time of each scene, cast appearing in each scene, synopsis of each scene, keywords, weather, season, and position (location). Of course, the metadata can also include various information for describing the segment other than the examples provided above. Also, the keywords can be extracted from the information (e.g. channel information, program name, broadcast time, cast, synopsis, etc.) included in the metadata. FIG. 4 illustrates an example of metadata for the segments.

The scenario managing unit 320 may store and manage user scenarios. Here, a user scenario can include a keyword by which to search the metadata, including at least one of a cast, synopsis, location, and time.

In one example, the client device 130 can send a content creation request including a user scenario to the media cloud server 120. If the content creation request includes a user scenario, the scenario managing unit 320 can extract the user scenario from the request and store and manage the user scenario.

In another example, the scenario managing unit 320 can also be inputted with a user scenario in a designated format independently of a content creation request from a client device 130. In this case, the scenario managing unit 320 can implement a separate user interface for inputting a user scenario in a designated format, and can receive a user scenario as input through the user interface and store and manage the user scenario.

The synthesizing unit 325 may create a user content by using at least one segment that is stored in accordance to receiving a content creation request from the client device 130.

For example, when a content creation request is received, the synthesizing unit 325 can extract a user scenario included in the content creation request and analyze the user scenario to extract at least one keyword. Then, the synthesizing unit 325 can search the metadata for the at least one keyword extracted from the user scenario to extract at least one segment corresponding to the matching metadata, and can synthesize the at least one segment thus extracted to create a user content. Here, the synthesizing unit 325 can perform a match search for the keywords and metadata, and then extract and synthesize at least one segment that corresponds to the metadata having the highest match rates. Here, a match rate may refer to the rate of matching between the keywords and the metadata. For example, if there are three keywords, and two of them match with a first set of metadata, then the match rate can be 67%.

A user scenario can include scenario information for each scene. In such cases, the synthesizing unit 325 can extract at least one keyword from the scenario information for each scene, perform a match search with the metadata to reference at least one set of metadata having the highest match rates, and extract the corresponding segments.

In such cases, the synthesizing unit 325 can arrange each of the segments in accordance with the user scenario and then synthesize the segments to create a user content. That is, the user content can be created by synthesizing the extracted segments in the order of each scene included in the user scenario.

For easier explanation and better understanding, the descriptions in the present specification will focus on examples in which the segments are extracted by a matching between keywords and metadata and subsequently synthesized. However, various other methods can be used, for example, extracting the segments by a matching between the user scenario and the metadata and synthesizing the extracted segments.

The content provider unit 330 may provide the user content to the client device 130.

For example, the content provider unit 330 can provide the user content by a download or a streaming method to the client device 130. The method itself for providing contents to a client device 130 by download or streaming is well known in the art and as such will not be elaborated here in further detail.

Also, since the user contents may be stored in a cloud storage medium, if there are multiple client devices 130 utilized by the user, the content provider unit 330 can provide an N screen service for the user content (i.e. a continuous playing of the user content) between the multiple number of client devices. To provide the N screen service, the content provider unit 330 can separately store and manage a play history for the user content. The play history can be a log related to the playing of the user content, storing information regarding the points at which the user content was played. If a user changes client devices 130 and requests a play of the user content, the corresponding play history can be referenced, and the content can be played continuing from the point at which the play was stopped for the previous client device.

In addition to the N screen service between multiple client devices carried by the user as described above, the user content can also be shared through client devices carried by different users. Here, the content provider unit 330 can generate a content list based on the user content created by the user, and can provide the generated content list to a client device carried by another user. Of course, in such cases, the attribute information of the user content can include separate settings for users or user groups with which the content may be shared.

The memory 335 may store the broadcast schedule information, the recorded broadcast contents, the segments for each broadcast content, and metadata.

The control unit 340 may control the internal components (e.g. the segmenting unit 310, metadata managing unit 315, scenario managing unit 320, synthesizing unit 325, content provider unit 330, memory 335, etc.) of a media cloud server 120 according to an embodiment of the invention.

Also, the control unit 340 can receive the broadcast content via through the broadcaster system 110 according to the user's recording request, to record and store the broadcast content. Of course, the control unit 340 can use the broadcast schedule information to record and store the broadcast contents transmitted from each broadcaster system 110.

Figure 5:
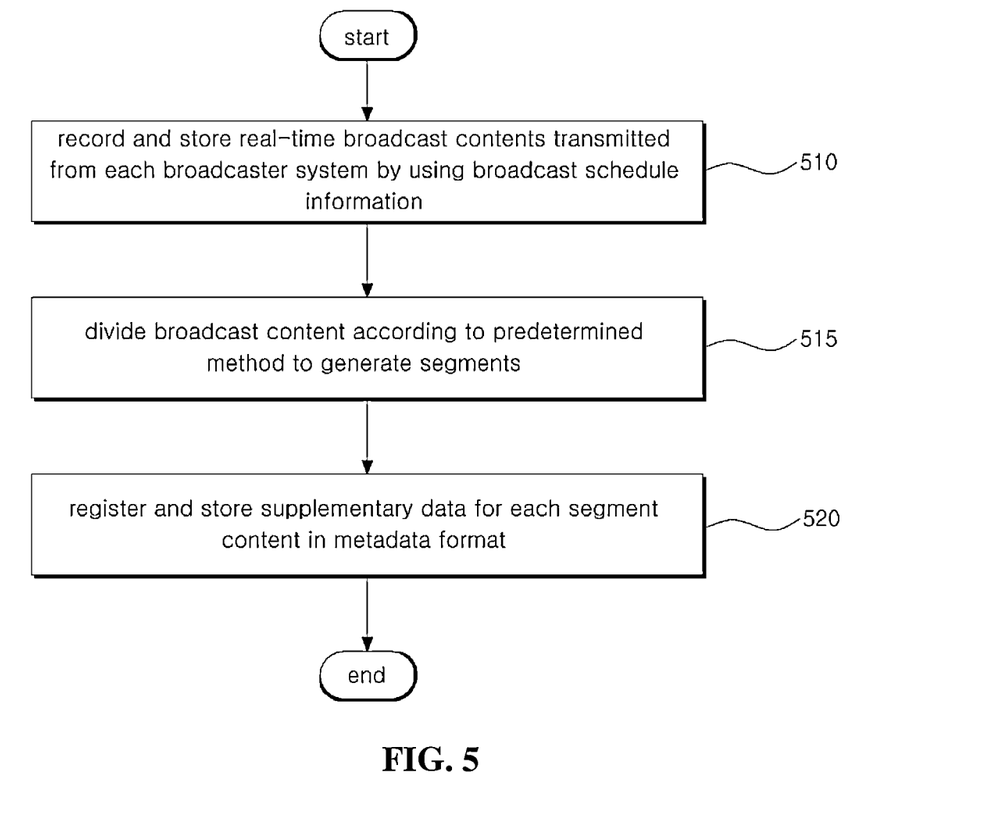
FIG. 5 is a flowchart illustrating a method for storing broadcast contents at a media cloud server according to an embodiment of the invention.

FIG. 5 is a flowchart illustrating a method for storing broadcast contents at a media cloud server according to an embodiment of the invention. In the descriptions that follow, the operation in each step may be performed by a respective internal component of the media cloud server, but the components performing the operations will be collectively referred to as the media cloud server for easier explanation and better understanding.

In step 510, the media cloud server 120 may record and store the broadcast contents transmitted from each broadcaster system 110 by using broadcast schedule information.

Of course, according to the method of implementation, the media cloud server 120 can also access a broadcaster system 110 to record and store only those broadcast contents that correspond to the recording requests of each client device 130.

In step 515, the media cloud server 120 may divide the recorded and stored broadcast content according to a predetermined method and to store it as segments.

As described above with reference to FIG. 3, the media cloud server 120 can generate the storage paths for storing the segments, by using at least one of the metadata for the broadcast content and the division method, and store the segments respectively in the corresponding storage paths.

For example, the media cloud server 120 can divide the frames forming a broadcast program to create and store a multiple number of segments. Here, the segments can be created sequentially.

For the case in which the initial frames include I1-B1-B2-B3-P1-I2-B4-B5-B6-P2-P3-I3-I4-B7-P4 as in the example shown above, and in which one segment is set to be formed of three frames, the media cloud server 120 may create a first segment using the I1-B1-B2 frames, i.e. the front frames.

As the frame following the first segment is the B3 frame, which is not an I-frame, the media cloud server 120 may use the B2 frame to create the I101 frame, corresponding to the first frame of the second segment, and thus create the second segment to include the I101-B3-P1 frames.

That is, if the frame following the last frame included in the first segment is not an I-frame, the media cloud server 120 may generate the first I-frame for the second segment based on the last frame of the first segment.

By a similar method, the next segments can be created sequentially.

During the procedure for creating segments, the media cloud server 120 can determine whether or not there are consecutive I-frames, and if there are consecutive I-frames, then the media cloud server 120 can recognize that there is a change in the scenes.

Although the descriptions above present an example in which the segments are created sequentially, the invention is not thus limited. For example, it is also possible to identify the overall arrangement of the frames and create beforehand the I-frames that are to serve as the first frame of each segment.

Although FIG. 5 does not mention a separate procedure for storing metadata for the broadcast contents, the media cloud server 120 can store the metadata for the broadcast contents by using the corresponding broadcast schedule information. Of course, according to the method of implementation, the metadata for the broadcast contents can also be received through the corresponding broadcaster systems 110 when receiving the broadcast contents.

In step 520, the media cloud server 120 may register and store the metadata for each of the segments. As described above, the metadata for each segment can include at least one of broadcast channel information, cast appearing in each scene, synopsis of each scene, location of each scene, and broadcast time.

Although it is not mentioned in FIG. 5, it is obvious that the broadcast contents, segments, user content, etc., may be stored in a cloud storage space.

Figure 6:
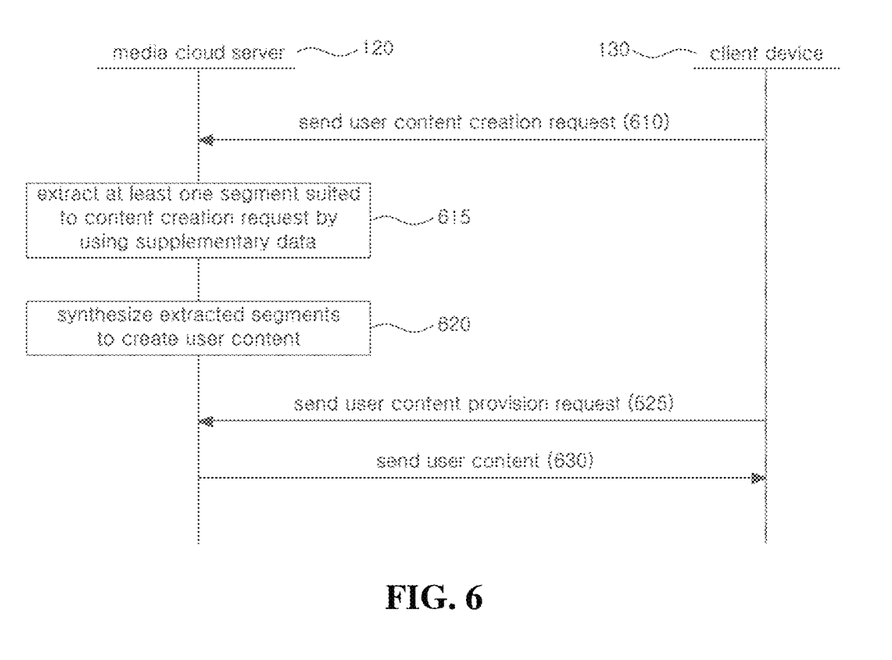
FIG. 6 is a flow diagram illustrating a method of creating a user content using broadcast contents according to an embodiment of the invention.

FIG. 6 is a flow diagram illustrating a method of creating a user content using broadcast contents according to an embodiment of the invention. In the descriptions that follow, it will be assumed that at least one broadcast content was recorded and stored according to a designated method as segments and that the metadata for each of the segments is stored, as described above with reference to FIG. 5. The following describes procedures that may be performed subsequently.

In step 610, the client device 130 may send a content creation request to the media cloud server 120. Here, a content creation request can also include a user scenario. Of course, according to the method of implementation, it is also possible for the content creation request not to include a user scenario. That is, the client device 130 can also send a user scenario to the media cloud server 120 separately before or after the content creation request.

In another example, the client device 130 can be provided with a separate user interface from the media cloud server 120 though which to receive a user scenario as input before or after requesting content creation, so that a user may input a user scenario through the user interface.

Also, the user scenario can include scenario information for each scene, or can be written in the form of an overall scenario without distinction of scenes.

In the descriptions that follow, it will be assumed that a content creation request sent from a client device 130 includes a user scenario. The following describes procedures that may be performed subsequently.

As described above, a user scenario can include information on at least one of the synopsis, location, time, and cast, with which to search the metadata for the segments.

In step 615, the media cloud server 120 may extract and analyze the user scenario included in the content creation request received from the client device 130, and may search the metadata corresponding to each segment to extract at least one segment having the highest match rates.

For example, the user scenario may include information on at least one of a synopsis, location, time, and cast, as described above, and such information can be included in the metadata of each segment. Thus, the media cloud server 120 can analyze the elements of the user scenario and extract a meaningful keyword, and then perform a match search between the metadata of each content and the extracted keyword to extract the segment having the highest match rate.

Of course, if there are a multiple number of keywords extracted from the user scenario, the media cloud server 120 can perform a match search between the keywords extracted from the user scenario and the metadata, and then extract the segments corresponding to the metadata having the highest match rates (the highest match percentages).

In step 620, the media cloud server 120 may synthesize at least one segments thus extracted, to create a user content. Here, the media cloud server 120 can create the user content by synthesizing the extracted segments in the order included in the user scenario. The user content thus created may be stored in a cloud storage space.

In step 625, the media cloud server 120 may receive a user content provision request from a client device 130.

Accordingly, in step 630, the media cloud server 120 may send the user content according to the corresponding request by a download or a streaming method.

The media cloud server 120 can store the play history for each user content. Here, the play history can include the time at which a play was stopped.

In this way, the media cloud server 120 can provide a streaming service, without having the user content interrupted, between multiple client devices carried by the user.

The method for creating a user content suited to a user scenario by using broadcast contents, according to an embodiment of the invention, can be implemented in the form of program instructions that can be executed by various means for processing electronic information, and can be recorded on a storage medium. The storage medium can include program instructions, data files, data structures, etc., alone or in combination.

The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc.

The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A media cloud server comprising:
   a segmenting unit configured to record and store a real-time broadcast content transmitted through a broadcaster system, the segmenting unit configured to divide the stored broadcast content according to a predetermined method and store the content as segments;
   a metadata managing unit configured to store metadata including descriptions of the segments; and
   a synthesizing unit configured to extract at least one segments using the metadata and synthesize the extracted segments to create a user content, in response to a request indicating a user scenario from a client device, wherein
   the user scenario includes information related to a plurality of scenes having an order defined by a user, the information including a cast, a synopsis, a time, and a location for each scene of the plurality of scenes,
   the synthesizing unit analyzes the user scenario to extract a keyword for each scene, performs a match search for the extracted keyword and the metadata, extracts segments most closely matching the respective scenes in the user scenario, and synthesizes the extracted segments according to the defined order in the user scenario, and
   the metadata includes identification information for the extracted segments, a cast in each scene, a synopsis of each scene, channel information, a broadcast time, and a broadcast content name.

2. The media cloud server of claim 1, wherein the plurality of segments each comprise an n number of frames (where n is a natural number equal to 1 or higher), and a first frame of each of the plurality of segments comprises an I-frame (intra-coded frame).

3. The media cloud server of claim 2, wherein the segmenting unit creates a first segment by using a front frame of the real-time broadcast content, and if a frame following a last frame included in the first segment is not an I-frame, then the segmenting unit creates a first I-frame for a second segment based on the last frame.

4. The media cloud server of claim 1, wherein the segmenting unit creates the segments such that, if frames forming the real-time broadcast content include a first I-frame and a second I-frame appearing consecutively and being for a part where there is a change of scene, a segment beginning with the second I-frame is generated.

5. The media cloud server of claim 1, wherein the synthesizing unit extracts and synthesizes the segments having high match rates.

6. The media cloud server of claim 1, wherein the segmenting unit further acquires metadata including a description of the broadcast content via the broadcaster system, and the segmenting unit generates a storage path for storing the segment by using the metadata of the broadcast content and stores the segment at the storage path.

7. The media cloud server of claim 1, further comprising:
   a content provider unit configured to provide the user content by a download or a streaming method according to a content provision request from the client device.

8. The media cloud server of claim 7, wherein the content provider unit stores a play history according to a provision of the user content,
   and if a user requests a continued play of the user content through a different client device carried by the user, the content provider unit provides a stream of the user content without interruption by using the play history.

9. The media cloud server of claim 7, wherein the user content is set to be shared with another user or user group,
   and the content provider unit provides the user content to the another user or user group according to a request from the another user or user group.

10. The media cloud server of claim 1, wherein the segmenting unit divides the broadcast content into at least one of predetermined periods, frame units, particular durations, sub-program units, and scene units.

11. A method of creating a content, the method comprising:
    recording and storing a real-time broadcast content transmitted through a broadcaster system;
    dividing the stored broadcast content according to a predetermined method and storing the segments;
    storing metadata including descriptions of the segments; and
    creating a user content by extracting at least one segments using the metadata and synthesizing the extracted segments in response to a request indicating a user scenario from a client device, wherein
    the user scenario includes information related to a plurality of scenes having an order defined by a user, the information including a cast, a synopsis, a time, and a location for each scene of the plurality of scenes,
    the creating of the user content comprises: analyzing the user scenario to extract a keyword for each scene, performing a match search for the extracted keyword and the metadata, extracting segments most closely matching the respective scenes in the user scenario, and synthesizing the extracted segments according to the defined order in the user scenario, and
    the metadata includes identification information for the extracted segments, a cast in each scene, a synopsis of each scene, channel information, a broadcast time, and a broadcast content name.

12. The method of claim 11, wherein the creating of the user content further comprises:
    extracting and synthesizing the segments corresponding to metadata having high match rates.

13. A recorded medium having recorded thereon and tangibly embodying a program of instructions for performing the method for creating a content according to claim 11 or claim 12.

14. A media cloud server comprising:
    a memory for storing at least one application; and
    a processor linked with the memory and configured to execute the application stored in the memory,
    wherein the executed application performs the steps of:
    recording and storing a real-time broadcast content transmitted through a broadcaster system, dividing the stored broadcast content according to a predetermined method, and storing the segments;
    storing metadata including descriptions of the segments; and
    creating a user content by extracting at least one segments using the metadata and synthesizing the extracted segments in response to a request indicating a user scenario from a client device, wherein the user scenario includes information related to a plurality of scenes having an order defined by a user, the information including a cast, a synopsis, a time, and a location for each scene of the plurality of scenes, the creating of the user content comprises: analyzing the user scenario to extract a keyword for each scene, performing a match search for the extracted keyword and the metadata, extracting segments most closely matching the respective scenes in the user scenario, and synthesizing the extracted segments according to the defined order in the user scenario, and the metadata includes identification information for the extracted segments, a cast in each scene, a synopsis of each scene, channel information, a broadcast time, and a broadcast content name.

* * * * *